United States Patent
Conrads et al.

(10) Patent No.: US 6,246,746 B1
(45) Date of Patent: Jun. 12, 2001

(54) X-RAY EXAMINATION APPARATUS WITH X-RAY IMAGE SENSOR MATRIX AND CORRECTION UNIT

(75) Inventors: Norbert Conrads, Raeren (BE); Martin Weibrecht, Aachen (DE); Ulrich Schiebel, Aachen (DE); Herfried K. Wieczorek, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/125,482

(22) PCT Filed: Dec. 23, 1997

(86) PCT No.: PCT/IB97/01595
§ 371 Date: Aug. 19, 1998
§ 102(e) Date: Aug. 19, 1998

(87) PCT Pub. No.: WO98/28911
PCT Pub. Date: Jul. 2, 1998

(30) Foreign Application Priority Data

Dec. 23, 1996 (EP) .................................. 96203692

(51) Int. Cl.[7] ...................................... H04N 1/00
(52) U.S. Cl. ........................... 378/98.7; 378/112
(58) Field of Search ................. 378/98.2, 98.7, 378/98.12; 250/370.09

(56) References Cited

U.S. PATENT DOCUMENTS 5,778,044 * 7/1998 Bruijns ......................... 378/98.12

5,974,113 * 10/1999 Bruijns et al. .................... 378/98.7

FOREIGN PATENT DOCUMENTS

0440282A2   8/1991   (DE) .
0444720A1   9/1991   (DE) .
0642264A1   3/1995   (EP) .

OTHER PUBLICATIONS

"Measurement and Simulation of the Dynamic Performance of A–Si:H Image Sensors", Journal of Non–Cyrstalline Solids 164–166 (1993), 781–784, Herfried Wieczorek.

* cited by examiner

*Primary Examiner*—Craig E. Church
(74) *Attorney, Agent, or Firm*—John F. Vodopia

(57) ABSTRACT

An x-ray examination apparatus comprises an x-ray image sensor matrix (1) for deriving an initial image signal from the x-ray image. The sensor elements of the x-ray sensor matrix convert incident x-rays into electric charges. These electric charges are read-out and converted into the initial image signal. Further a correction unit (2) is provided for correcting the initial image signal, notably for disturbances due to delayed transferred charges, that have been retained in the sensor elements for some time. The correction unit (2) is provided with a memory which stores correction values. Further the correction provided with a selection unit (5) for selecting appropriate correction values from the memory (3).

3 Claims, 1 Drawing Sheet

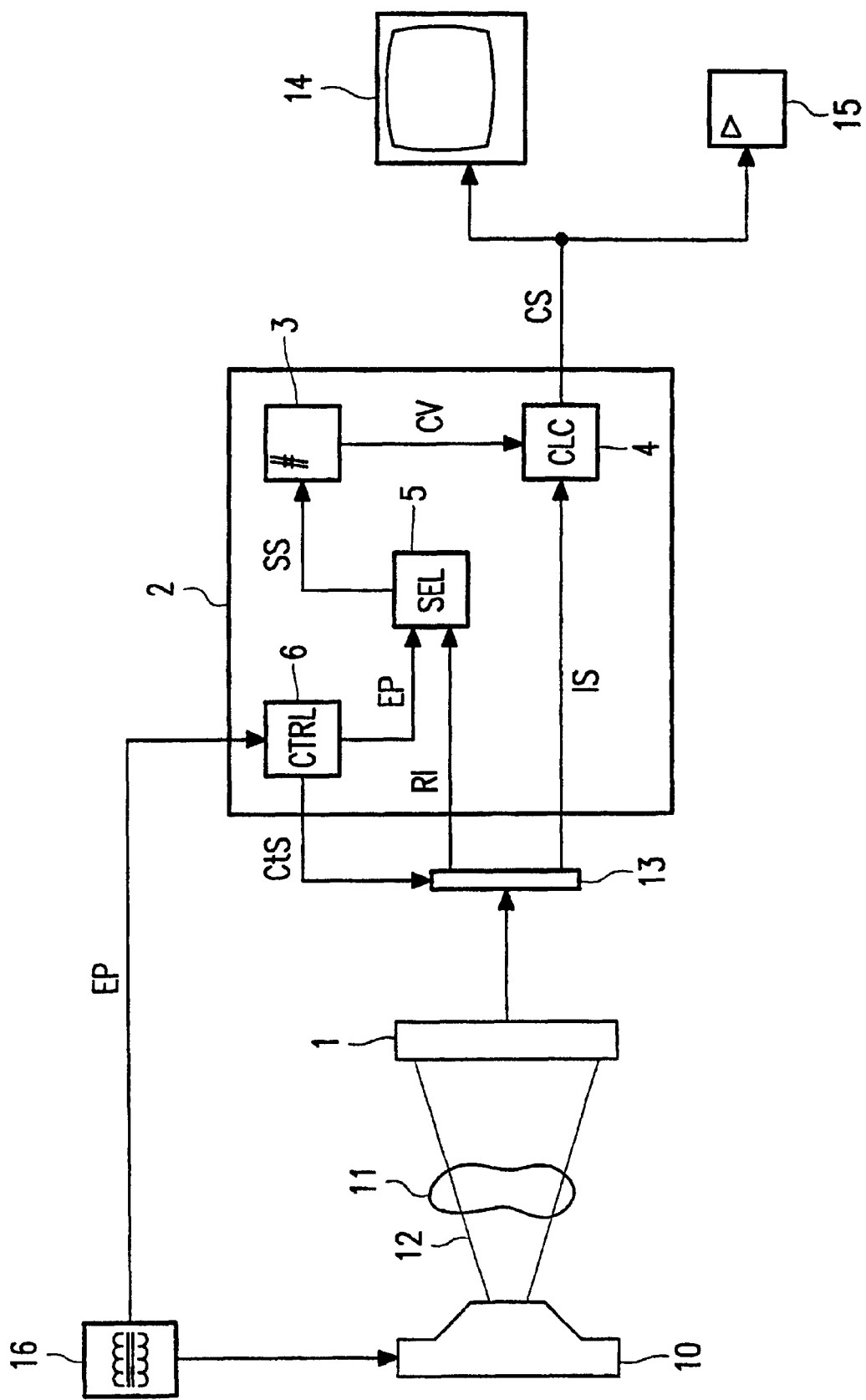

X-RAY EXAMINATION APPARATUS WITH X-RAY IMAGE SENSOR MATRIX AND CORRECTION UNIT

BACKGROUND OF THE INVENTION

1. Field of the Invention

The invention relates to an x-ray examination apparatus comprising an x-ray image sensor matrix for deriving an initial image signal from an x-ray image, a correction unit for deriving a corrected image signal from the initial image signal.

2. Description of Related Art

Such an x-ray examination apparatus is known from the European patent application EP 0 642 264.

The correction unit of the known x-ray examination apparatus counteracts disturbances in the initial image signal which are caused by delayed emission of charges from the x-ray image sensor matrix. Incident x-rays release electric charge carriers, i.e. photocharges, notably photoelectrons, in the x-ray image sensor matrix and these electric charges are detected. The signal levels of the initial image signal represent the detected charges. A part of the charge carriers can be trapped in a trap-state, be retained in such a trap-state, and can escape from the trap-state at a later stage and are detected as electric charges with a delay. If the initial image signal with the disturbances were applied to a monitor for displaying the image information, not only the image information of the instantaneous image would be reproduced, but at the same time also image information of a previously picked-up image. As a result after-images would be displayed together with the instantaneous image.

The correction unit of the known x-ray examination apparatus utilises an intricate mathematical model based on physical considerations for the trapping and subsequent release of charge carriers so as to correct disturbances due to charge carriers emitted in a delayed fashion. A drawback of the correction unit of the known x-ray examination apparatus is that the computations required to obtain the corrected image signal are rather complicated so that a powerful arithmetic unit is required which nevertheless requires a rather long computation time. Hence, the time between forming the x-ray image and displaying the image information is relatively long so that the known x-ray examination apparatus is not well suitable for imaging rapid dynamic processes in which variations occur within a period of time comparable to the required computation time. Moreover, the required programming of the arithmetic unit is complicated, so that highly skilled staff is needed to set up the correction unit.

SUMMARY OF THE INVENTION

An object of the invention is to provide an x-ray examination apparatus which requires, in comparison with the known x-ray examination apparatus, a shorter period of time to derive the corrected image signal from the initial image signal.

This object is achieved by means of an x-ray examination apparatus according to the invention which is characterised in that the correction unit includes a memory for storing correction values and an arithmetic unit for computing signal levels of the corrected image signal from signal levels of the initial image signal and at least some of said correction values.

The correction values are obtained from a separate calibration of the x-ray examination apparatus. This calibration involves irradiating the x-ray image sensor matrix with a predetermined calibration x-ray exposure. In particular, this predetermined calibration x-ray exposure is carried out by way of applying a pre-selected number of x-ray pulses with a pre-selected pulse-length, pulse-rate and x-ray dose per pulse. Subsequent to the calibration x-ray exposure the x-ray image sensor is read-out so as to obtain a calibration image signal. That is, the charge carriers in respective sensor elements of the x-ray sensor matrix after the predetermined calibration x-ray exposure are detected. The period of time elapsing between the calibration x-ray exposure and the generation of the calibration image signal is recorded or controlled. The calibration image signal represents the electric charges emitted during read-out after said period of time since the predetermined calibration x-ray exposure.

The physical process of trapping and releasing of electric charges in the x-ray image sensor matrix is represented by a mathematical model containing a small number of model parameters. This mathematical model has been disclosed in more detail in the article '*Measurements and simulation of the dynamic performance of an α-Si:H image sensors*' in the Journal of Non-crystalline solids Vol.164–166(1993) 781–784. Values for the model parameters are derived from the calibration image signal, in particular by performing a best fit to the mathematical model. On the basis of the values of the model parameters there are computed correction values which represent delayed electric charges for separate x-ray exposure circumstances and for arbitrary periods of time lapsed since the latest x-ray exposure. This computation of the correction values can be performed separately from the x-ray examination apparatus, but the arithmetic unit of the x-ray examination apparatus itself can also be used. Sets of correction values are stored which relate to various x-ray exposure circumstances. In particular, sets of correction values are stored for separate values of the number of preceding x-ray pulses, the x-ray pulse rate, respective intensities of the preceding x-ray pulses. Each set includes correction values for several values of the time lapsed since the latest x-ray pulse.

Instead of calculating correction values for various periods of time lapsed since the latest x-ray exposure by way of the mathematical model, such correction values can be derived from a calibration signal sequence. The calibration signal sequence is formed by reading out the x-ray image sensor matrix at several instants after the latest x-ray exposure. The signal levels of the calibration signal sequence represent the decay of trapped charges as time proceeds. Hence, the correction values for separate periods of time lapsed since the latest x-ray exposure can be derived from the calibration signal sequence without calculations based on the mathematical model.

The arithmetic unit computes the signal levels of the corrected image signal from the signal levels of the initial image signal and the correction values. Only relatively simple computations are required such as subtracting the correction values from the signal levels of the initial image signal. Because the computations involving the mathematical model of the trapping and release of charges need only to be carried-out once for the calibration image signal, for correcting the initial image signal only simple calculations are required. The simplicity of the required calculations is achieved at the expense of storing a number of correction values which is substantially larger than the small number of model parameters.

Since retrieving correction values from the memory can be done very rapidly and because only simple calculations are required, it takes only a short time to derive the corrected image signal after the initial image signal has been read out. Moreover, electronic memories having a large storage capacity are commercially available and are relatively inexpensive. The x-ray examination apparatus according to the invention is suitable to handle x-ray images at a rate of 25–30 or even 60 images per second. Therefore, the x-ray examination apparatus according to the invention is especially suitable for real time x-ray imaging for instance in interventional procedures. In particular after images are suppressed when fluoroscopy is performed by continuously irradiating at low x-ray dose after one or a few brief x-ray exposures at high-dose have been carried-out.

A preferred embodiment of x-ray examination apparatus according to the invention is characterised in that the correction unit includes a selection unit for selecting correction values from the memory on the basis of exposure parameters.

The selection unit selects correction values which pertain to an x-ray exposure which has preceded the formation of the x-ray image. The preceding x-ray exposure has caused trapped charges which give rise to disturbances in the initial image signal. To select appropriate correction values from the memory, the selection unit receives information on the preceding x-ray exposure from the x-ray examination apparatus. Such information is readily available from for example a central control unit of the x-ray examination apparatus.

A preferred embodiment of x-ray examination apparatus according to the invention is characterised in that the correction unit is arranged to generate a reference image signal from the x-ray sensor matrix, the selection unit is arranged to select the correction values on the basis of the reference image signal.

The reference image signal is generated when no x-rays are incident on the x-ray sensor matrix. Amounts of charge having remained in respective sensor elements since a previous x-ray exposure are detected and the signal levels of the reference image signal represent these charges. In fact, the reference image signal represents an after image that is still present in the x-ray sensor matrix at the moment that the reference image signal is generated. The reference image signal represents that amounts of electric charge trapped in respective sensor elements can be different. Such differences are in particular due to the fact the respective sensor elements can receive different x-ray doses due to the previous x-ray exposure. Accurate correction values are selected from the reference image signal and a few exposure parameters, such as the x-ray pulse rate and the number of x-ray pulses, relating to the previous x-ray exposure. These selected correction values correspond to the charges that remain trapped in the sensor elements at the moment of the generation of the initial image signal. The period of time between the previous x-ray exposure and the generation of the initial image signal is either recorded or controlled so as to select correction values which take into account the decay of trapped charges during that period of time. That decay with time is accurately included in the mathematical model or in the calibration signal sequence, so that the calibration provides correction values which accurately takes into account that trapped charges decay with time.

A preferred embodiment of x-ray examination apparatus according to the invention is characterised in that the arithmetic unit is arranged to compute correction values from stored correction values.

Sets of correction values for only a limited number of values for the exposure parameters need to be stored in the memory. Separate sets contain correction values for respective amounts of the exposure parameters and for several values of the time lapsed since the previous x-ray exposure. It appears advantageous to store separate sets of correction values relating to less than ten different x-ray pulse rates, less than ten different values for the number of x-ray pulses and about a few dozen different values for the x-ray dose per pulse. This amounts to several hundreds of sets of correction values that are stored in the memory.

A preferred embodiment of x-ray examination apparatus according to the invention is characterised in that the arithmetic unit is arranged to interpolate said computed correction values between stored correction values.

Interpolation is a simple, rapid and accurate method to derive a correction value from stored correction values. Thus, only correction values for a relatively small number of values for the model parameters need to be stored. Correction values relating to values of model parameters for which no correction values are stored are interpolated from correction values relating to values of model parameters which are close to the values at issue. Further, correction values relating to an arbitrary time lapsed since the latest x-ray exposure can be calculated from stored correction values for particular values for said lapsed time. Preferably a bisection method is employed for rapidly finding correction values which are employed for the interpolation.

BRIEF DESCRIPTION OF THE DRAWINGS

These and other aspects of the invention will be elucidated with reference to the embodiments described hereinafter and with reference to the accompanying drawing wherein the FIGURE shows diagrammatically an x-ray examination apparatus according to the invention.

DESCRIPTION OF THE PREFERRED EMBODIMENT

The FIGURE shows diagrammatically an x-ray examination apparatus according to the invention. An x-ray source 10 is arranged to irradiate an object 11, in particular a patient who is to be radiologically examined, with an x-ray beam 12. Owing to locally varying x-ray absorption in the patient, the x-ray image is formed on the x-ray image sensor matrix 1. The x-ray image sensor matrix comprises a large number, e.g. $512 \times 512$, $1k^2$, $2k^2$ or even $3k^2$ sensor elements which convert x-radiation into electrical charges. These electrical charges are detected by way of a multiplex circuit and from these read-out charges the initial image signal is derived. Methods for the detection of electric charges in an image sensor matrix so as to read out the image information picked up are known as such, for example from the European patent applications EP 0 440 282 and EP 0 444 720. In particular, the initial image signal is an electronic video signal which is supplied to a bus 13 which couples the x-ray image sensor matrix to the correction unit 2. Owing to trapped charges, the initial image signal is disturbed in that the initial image signal also represents after images. The correction unit 2 removes such disturbances from the initial image signal and supplies the corrected image signal to a monitor 14 and/or to a buffer 15. On the monitor 14, the image information in the x-ray image is displayed without after images. Thus, the displayed image has a high diagnostic quality in that small details with little contrast are rendered well visible. The image stored in the buffer 15 may be further processed and/or supplied to a hard-copy unit which forms a hard-copy of the image, e.g. the hard-copy unit prints the image on a transparent sheet.

In order to correct the initial image signal, an appropriate correction value (CV) is selected from the memory 3 by way of the selection unit 5. The selected correction value (CV) is supplied to the arithmetic unit 4 together with the initial image signal (IS). The arithmetic unit computes the signal level of the corrected image signal (CS) from the signal level of the initial image signal (IS) and the correction value (CV). In the event that the memory 3 does not contain correction values for relevant the values of the exposure parameters, then an accurate correction value is obtained by interpolation between stored correction values. The selection unit 5 supplies a selection signal (SS) to the memory 3 so as to indicate the appropriate address in the memory 3 which contains the correction value at issue. The selection signal represents exposure parameters (EP) of preceding x-ray exposures that have caused trapped charges in the sensor elements. In particular, the control unit 6 supplies exposure parameters such as the peak radiation intensity of preceding x-ray pulses, the duration of the preceding pulses, the number of preceding pulses, and/or the pulse rate and the time lapsed since the latest x-ray pulse. The control unit 6 is coupled with the high-voltage generator 16 of the x-ray source 10 so as to receive the relevant values of the exposure parameters.

The control unit further arranges to form the reference image (RI) when no x-rays are incident on the x-ray sensor matrix. To form the reference image the control unit supplies a control signal (CtS) to detect remaining charges in the x-ray image sensor matrix 1. Preferably, the delay between the generation of the initial image signal and the preceding irradiation and the delay between the generation of the calibration image signal and the calibration x-ray exposure are arranged to be equal. Then the signal levels of the reference image correspond to signal levels of the calibration image signal at the x-ray dose received at respective sensor elements. Thus, for respective sensor elements, the relevant set of correction values is easily selected according to the signal level of the reference image. The selected set of correction values represents the decay with time of the trapped charges in the sensor element at issue.

Further, the control unit 6 is arranged to switch the x-ray image sensor matrix 1 with the correction unit between an imaging mode and a calibration mode. In the calibration mode a predetermined series of calibration x-ray exposures is carried-out from which the relevant values of the model parameters are derived by the arithmetic unit 4. The arithmetic unit 4 subsequently derives the correction values on the basis of the mathematical model.

Advantageously, the arithmetic unit 4 comprises a fast processor which is particularly suitable for real-time correction of the initial image signal by way of the correction values. In addition the arithmetic unit 4 comprises a separate suitably programmed general purpose processing unit for controlling the recording of the calibration signal and computing the model parameters. The general purpose processing unit is coupled to the control unit 6 so as to receive the exposure parameters. The general purpose processing unit is also coupled to the bus 13 so as to receive the calibration signal. The general purpose processing unit supplies the correction values to the memory 3. In particular, the general purpose processing unit comprises programmable hardware suitable to perform the calculations according to the mathematical model.

All references cited herein, as well as the priority document European Patent Application 96203692.7 filed Dec. 23, 1996, are incorporated herein by reference in their entirety and for all purposes to the same extent as if each individual publication or patent or patent application was specifically and individually indicated to be incorporated by reference in its entirety for all purposes.

What is claimed is:

1. An x-ray examination apparatus, comprising:

an x-ray image sensor matrix for deriving a calibration image signal from a predetermined calibrated x-ray exposure, and an initial image signal from an x-ray image, and a correction unit for deriving a corrected image signal from the initial image signal, wherein the correction unit includes a memory for storing correction values derived from the calibration image signal and an arithmetic unit for computing signal levels of the corrected image signal from signal levels of the initial image signal and at least some of said correction values in order to take delayed charges into consideration during correction, wherein the correction unit includes a selection unit for selecting correction values from the memory on the basis of exposure values, the correction unit arranged to generate the calibration image signal from the x-ray sensor matrix subsequent to the predetermined calibrated x-ray exposure of the matrix, when essentially no x-rays are incident on the x-ray sensor matrix, and wherein the selection unit is arranged to select the correction values on the basis of the reference image signal.

2. An x-ray examination apparatus as claimed in claim 1 wherein the arithmetic unit is arranged to compute accurate correction values from stored correction values, and to compute signal levels of the corrected image signal from signal levels of the initial image signal and said accurate correction values.

3. An x-ray examination apparatus as claimed in claim 2 wherein the arithmetic unit is arranged to interpolate said computed correction values between stored correction values.

* * * * *